United States Patent [19]

Awaji et al.

[11] Patent Number: 5,476,165
[45] Date of Patent: Dec. 19, 1995

[54] FIXING STRUCTURE FOR OUTER RING MEMBER IN ONE-WAY CLUTCH

[75] Inventors: Toshio Awaji; Hirofumi Ogata, both of Shizuoka, Japan

[73] Assignee: NSK-Warner K.K., Tokyo, Japan

[21] Appl. No.: 330,549

[22] Filed: Oct. 28, 1994

[30] Foreign Application Priority Data

Nov. 2, 1993 [JP] Japan .................. 5-065636 U

[51] Int. Cl.$^6$ .................................................. F16D 41/06
[52] U.S. Cl. .................. 192/41 R; 192/45.1; 188/82.84
[58] Field of Search ................... 192/41 R, 45, 192/45.1; 188/82.84

[56] References Cited

U.S. PATENT DOCUMENTS

| | | | |
|---|---|---|---|
| 3,344,686 | 10/1967 | Baker | 192/45.1 X |
| 4,757,887 | 7/1988 | Ostrander et al. | 192/41 A |
| 4,874,069 | 10/1989 | Lederman | 192/45 |
| 4,883,152 | 11/1989 | Froment | 192/41 R X |
| 4,979,600 | 12/1990 | Zanoni | 192/45.1 X |
| 5,004,090 | 4/1991 | Kuribara et al. | 192/45 X |
| 5,042,628 | 8/1991 | Malecha | 192/45 |
| 5,076,408 | 12/1991 | Numata et al. | 192/45.1 X |
| 5,139,123 | 8/1992 | Rutke | 192/45.1 |
| 5,156,245 | 10/1992 | Fujiwara et al. | 192/45.1 X |
| 5,328,012 | 7/1994 | Takata | 192/45 |

FOREIGN PATENT DOCUMENTS

| | | |
|---|---|---|
| 5180 | 3/1991 | Japan . |
| 4-109231 | 9/1992 | Japan . |

*Primary Examiner*—Andrea L. Pitts
*Attorney, Agent, or Firm*—Evenson, McKeown, Edwards & Lenahan

[57] ABSTRACT

A fixing structure is provided for an outer ring member in a one-way clutch. The fixing structure includes a spring device having resilient force in the direction of an axis of the one-way clutch and interposed between an outer peripheral side wall of an outer ring member of the one-way clutch and a stopper ring secured on an associated housing. The spring device is in the form of at least one spring member which is discrete from any component of the one-way clutch to permit an easy change in a spring characteristic and is held between a side wall of the outer ring member and a side plate mounted on the side wall of the outer ring member. The spring member is in engagement at a part thereof with a part of the side plate so that any radial movement of the spring member is limited by the part of the side plate.

4 Claims, 5 Drawing Sheets

FIXING STRUCTURE FOR OUTER RING MEMBER IN ONE-WAY CLUTCH

BACKGROUND OF THE INVENTION a) Field of the Invention

This invention relates to a fixing structure for an outer ring member in a one-way clutch which is used as a torque-transmitting or backstop component in a drive system of an automotive vehicle or the like.

b) Description of the Related Art

No detailed explanation is believed to be needed on a one-way clutch, because it is well known in the art. To facilitate understanding of the present invention, however, certain essential points of a one-way clutch will be described. As shown by cutting away a part of a side plate 60 in FIG. 7, a one-way clutch mechanism arranged between an outer ring member 10 and an inner ring member 20 comprises rollers 50, springs 70, spring anchors 80, a cam surface 90 formed on an inner peripheral wall of the outer ring member 10, etc. Designated at numeral 60 is a side plate mounted on a side wall of the outer ring member 10.

As long as the inner ring member 20 rotates in a direction indicated by arrow $R_1$, no locking action is performed. As shown in FIG. 8, the outer ring member 10 is assembled in a housing 45 with each spline 15 fitted in a corresponding keyway 46 formed in the housing 45.

An angular clearance a is unavoidably left between the spline 15 and a wall of the corresponding keyway 46, so that even when the inner ring member 20 idles in the direction indicated by arrow $R_1$ in FIG. 1, the outer ring member 10 is caused to rotate by drag torque to produce a sharp metallic hitting noise due to the existence of an angular play.

As shown in a side cross-section of FIG. 9, it was hence proposed to interpose, at an outer peripheral portion of the outer ring member 10, a spring 40 between the outer ring member 10 and a stop ring 30, to always press the outer ring member 10 against an axially-positioning stop ring 35 so that the dragged rotation of the outer ring member 10 upon idling is eliminated to prevent the occurrence of a sharp metallic hitting noise.

According to this conventional approach, however, the spring 40 is a separate part so that the spring 40 has to be assembled at the user's end prior to assembling the one-way clutch on the housing 45. This has resulted in the drawbacks that more assembling steps are needed and the assembly work is cumbersome and time-consuming.

A fixing structure in which a spring is not provided as a separate member but a spring member is integrally formed on an outer peripheral edge portion of a side plate as a component of a one-way clutch was proposed "in house" at the assignee company of the present application. A Japanese utility model application was then filed on the fixing structure. After the Convention priority date of the present application, that application was laid open, that is, published to the public for the first time under Japanese Utility Model Application Laid-Open (Kokai) No. HEI 5-14669.

FIG. 10 is a front view of the fixing structure proposed "in house" at the assignee company of the present application, and FIG. 11 is a side cross-sectional view of the fixing structure. FIG. 10 shows the same section as FIG. 7, with a part of the side plate 60 being cut away. A T-shaped spring portion 65 is integrally formed on an outer peripheral edge portion of the side plate 60. This spring portion 65 is interposed between the outer ring member 10 and the stop ring 30 like the spring 40 illustrated in FIG. 9.

In the fixing structure shown in FIGS. 10 and 11, the side plate and the spring portion are integral when they are produced by the manufacturer so that the fixing structure of FIGS. 10 and 11 is free of the drawback of the fixing structure illustrated in FIG. 9. To always retain stable spring force, the entire side plate must be formed of a spring material because the spring portion and the side plate are integral. This is disadvantageous in manufacture and cost. Moreover, it is necessary to modify the shape, thickness and the like of the spring material when a change is desired in a spring characteristic. This leads to the drawback that substantial design changes are needed over the entirety of the side plate.

Summary of the Invention

With the foregoing in view, the present invention has as a primary object the provision of a fixing structure for an outer ring member in a one-way clutch, which is free or substantially free of the above-described drawbacks.

The present inventors have proceeded with an extensive investigation. As a result, it has been found that the above primary object of the present invention can be achieved by using spring means which is discrete from any component of the one-way clutch.

In one aspect of the present invention, there is thus provided a fixing structure for an outer ring member in a one-way clutch. The fixing structure includes spring means having resilient force in the direction of an axis of the one-way clutch and interposed between an outer peripheral side wall of an outer ring member of the one-way clutch and a stopper ring secured on an associated housing. The spring means is in the form of at least one spring member which is discrete from any component of the one-way clutch to permit an easy change in a spring characteristic and is held between a side wall of the outer ring member and a side plate mounted on the side wall of the outer ring member. Said at least one spring member is provided with engaging means, and the engaging means is in engagement with a part of the side plate so that any radial movement of the at least one spring member is limited by the part of the side plate.

According to the present invention, the side plate is provided with one or more spring members discrete members. It is hence unnecessary to form the side plate itself with a spring material and, even when it is desired to make a change in a spring characteristic, it is only necessary to modify the shape, thickness and/or the like of the spring member alone. The fixing structure according to the present invention is therefore advantageous in manufacture and cost. By assembling the spring member or members with the side plate, the one-way clutch and the spring member or members have an integral construction. Upon assembly of the one-way clutch on the user's end, fewer assembling steps are needed and the assembly work is easier

DETAILED DESCRIPTION OF THE INVENTION AND PREFERRED EMBODIMENTS

Figure 1:
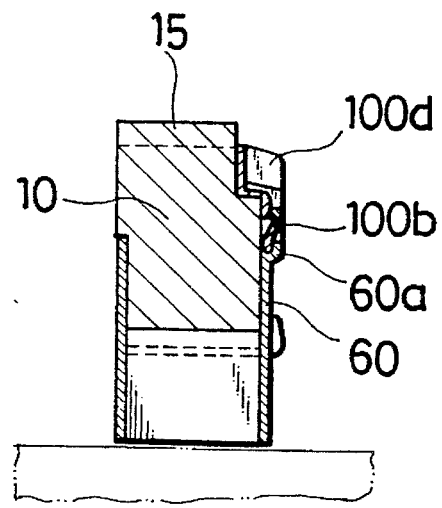
FIG. 1 is a side cross-sectional view of a fixing structure according to one embodiment of the present invention.
Figure 2:
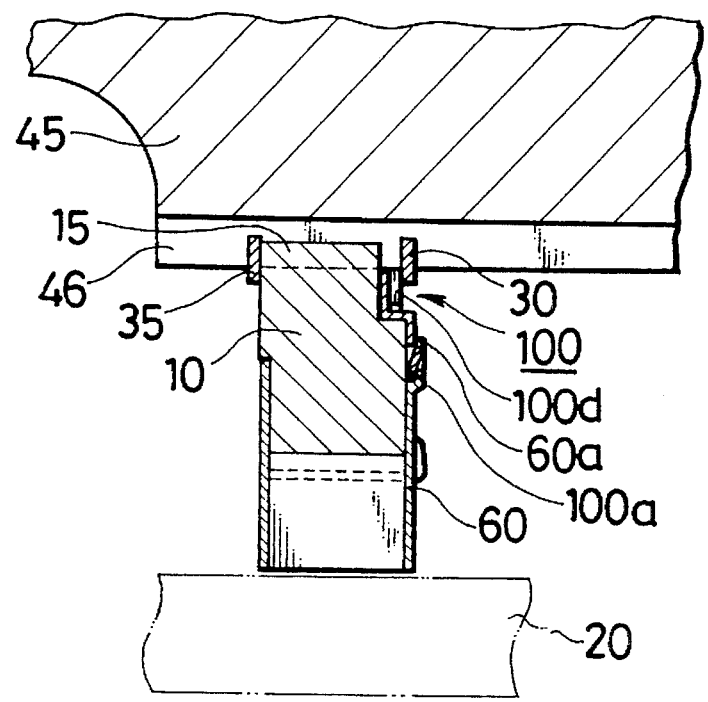
FIG. 2 is an illustration of the fixing structure as assembled on a housing.
Figure 3:
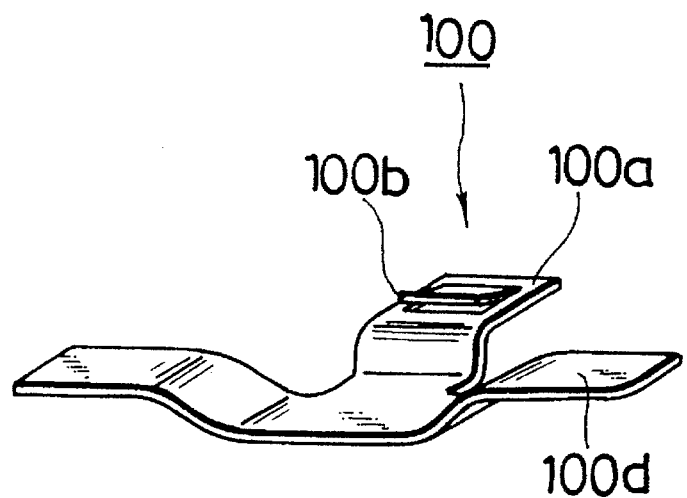
FIG. 3 is a perspective view of a spring member useful in the fixing structure.
Figure 4:
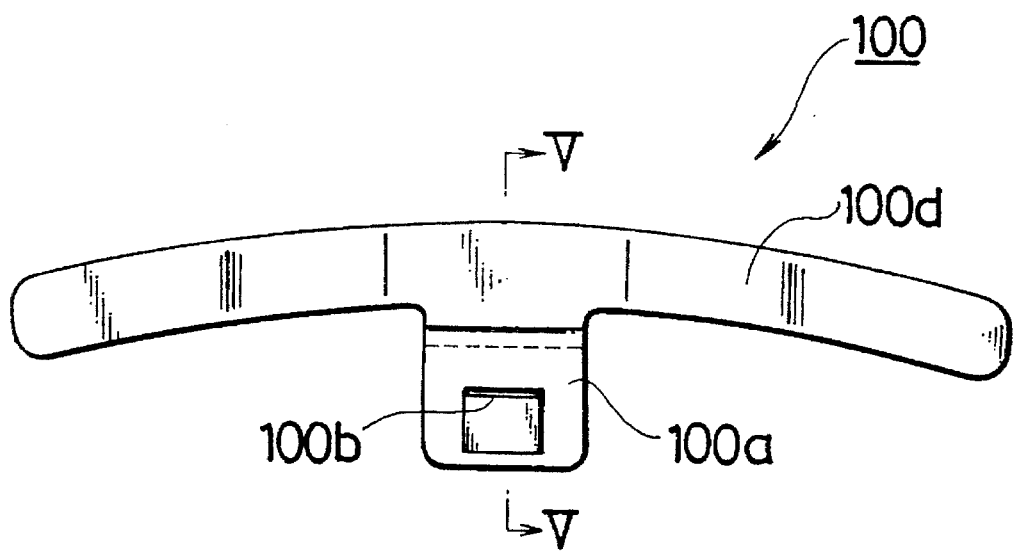
FIG. 4 is a front view of the spring member.
Figure 5:
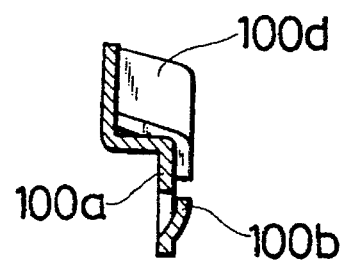
FIG. 5 is a cross-sectional view taken in the direction of arrows V—V of FIG. 4.
Figure 6:
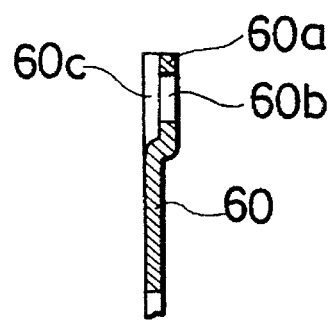
FIG. 6 is a cross-sectional view of an engaged portion of a side plate.
Figure 7:
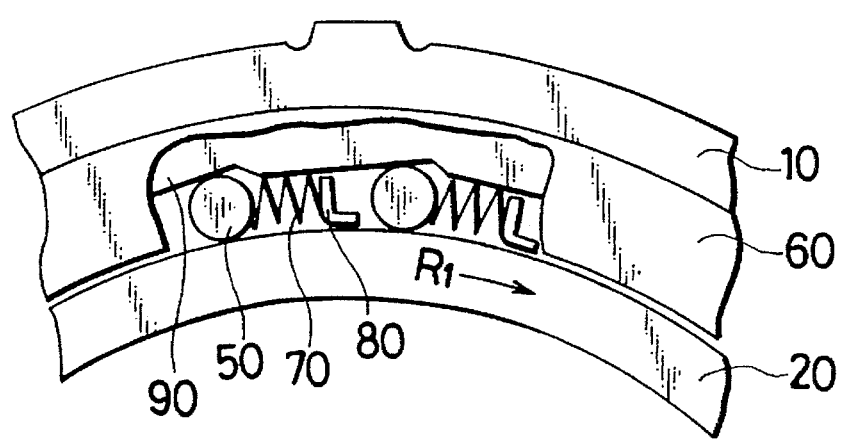
FIG. 7 is an illustration of a one-way clutch.
Figure 8:
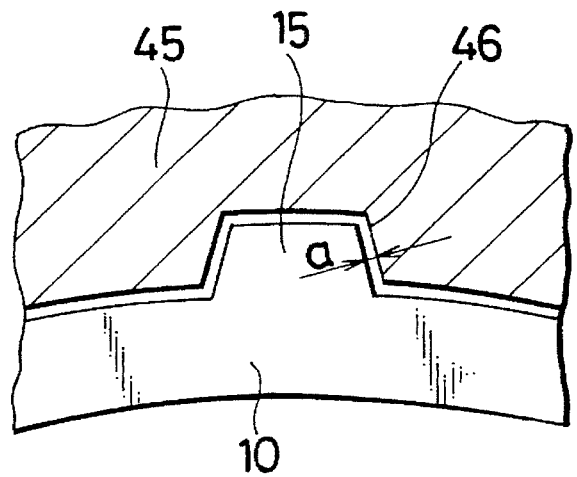
FIG. 8 is an illustration of a spline of an outer ring member, which is fitted in a corresponding keyway of a housing.
Figure 9:
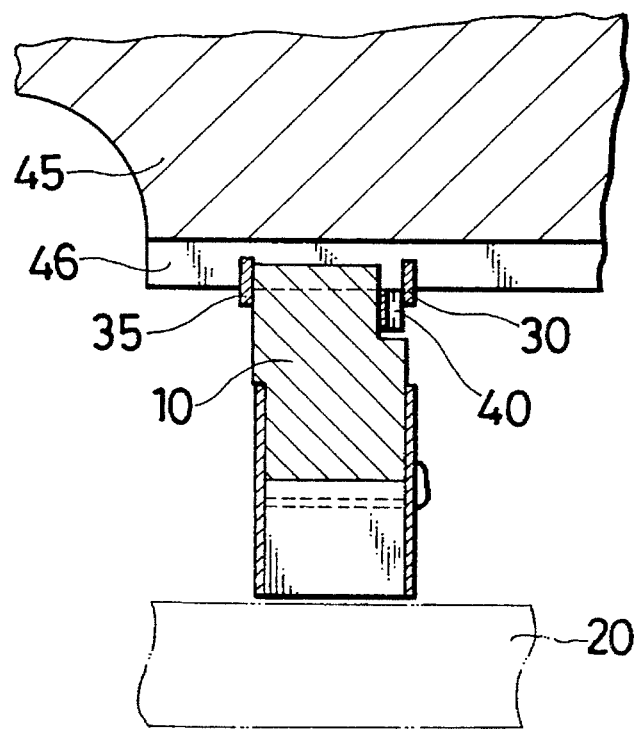
FIG. 9 is a cross-sectional view of a fixing structure according to a conventional example.
Figure 10:
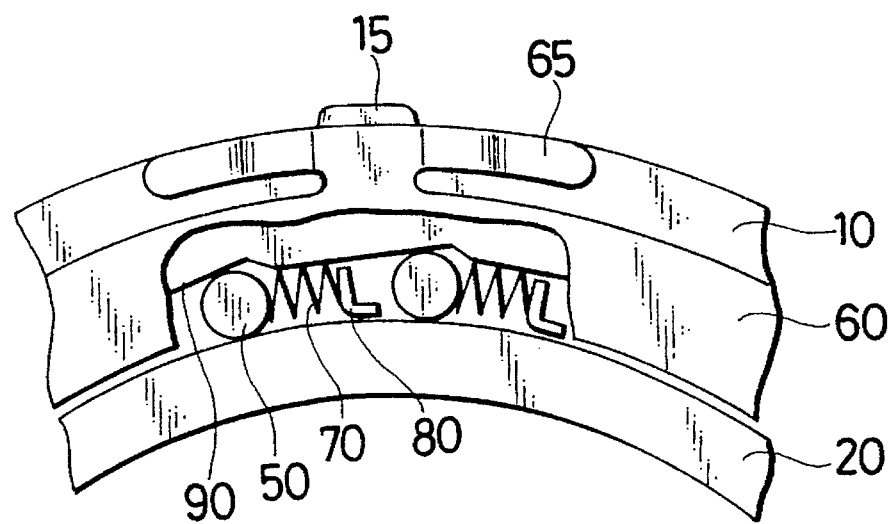
FIG. 10 is a front view of a fixing structure developed "in house" at the assignee company.
Figure 11:
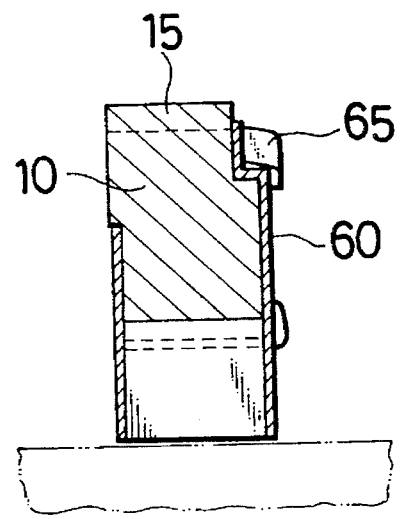
FIG. 11 is a side cross-sectional view of the fixing structure Of FIG. 10.

Referring to FIGS. 1 through 6, the fixing structure according to the embodiment of the present invention will hereinafter be described. As best shown in FIG. 3, a spring member 100 is formed of a lock portion 100a, a projecting portion 100b and a strip portion 100d. The projecting portion 100b has been formed by forming a square U-shaped cut in the spring member 100 and bending up an inside of said square U-shaped cut as a louver. At a part of the side plate 60 where the spring member 100 is locked, on the other hand, a bulged-out portion 60a is formed in an outer peripheral edge portion of the side plate 60 and a square opening 60b is formed through a part of the bulged-out portion 60a.

As is illustrated in FIG. 1, the lock portion 100a of the spring member 100 is received in a space 60c formed between the bulged-out portion 60a of the side plate 60 and the opposing side wall of the outer ring member 10. Further, the projecting portion 100b is inserted in the square opening 60b so that the projecting portion 100b serves as means for preventing the spring member 100 from falling out of the one-way clutch in a radial direction. The side plate 60 and the spring member 100 are hence locked together.

Referring next to FIG. 2, the strip portion 100d of the spring member 100 is arranged between the outer ring member 10 and the stopper ring 30, whereby the outer ring member 10 is maintained in contact with the stopper ring 35 under pressure. This has made it possible to prevent dragged rotation of the outer ring member 10 upon idling and hence occurrence of a sharp metallic noise.

Although the fixing construction in the above-described embodiment is provided with only one spring member 100 which is formed as a discrete member from the side plate 60, plural spring members similar to the spring member 100 can be arranged along an outer periphery of the side wall of the outer ring member 10.

What is claimed is:

1. A fixing structure for an outer ring member in a one-way clutch, said fixing structure including a spring having resilient force in the direction of an axis of said one-way clutch and interposed between an outer peripheral side wall of the outer ring member of said one-way clutch and a stopper ring secured on an associated housing, the improvement wherein:

said spring is in the form of at least one spring member which is discrete from any component of said one-way clutch to permit an easy change in a spring characteristic and is held between only a portion of a circumference of a side wall of said outer ring member and a side plate mounted on said side wall of said outer ring member; and said at least one spring member is provided with an engaging member, and said engaging member is in engagement with a part of said side plate so that any radial movement of said at least one spring member is limited by said part of said side plate.

2. A fixing structure according to claim 1, wherein said engaging member of said at least one spring member is a projecting portion formed in said at least one spring member, said part of said side plate is an opening formed in said side plate, and said projecting portion is received in said opening.

3. A fixing structure according to claim 2, wherein said projecting portion has been formed by forming a square U-shaped cut in said at least one spring member and bending up an inside of said square U-shaped cut as a louver, and said opening has been formed by bulging out a portion of said side plate and forming said opening through the bulged-out portion.

4. A fixing structure according to claim 1, wherein said spring in the form of plural spring members arranged along an outer periphery of said side wall of said outer ring member, each of said plural spring members is discrete from any component of said one-way clutch to permit an easy change in the spring characteristic and is held between said side wall of said outer ring member and said side plate mounted thereon, and said plural spring members are each provided with engaging means maintained in engagement with corresponding one of a like plural number of parts of said side plate.

* * * * *